Patented July 2, 1935

2,006,335

UNITED STATES PATENT OFFICE 2,006,335

PROCESS FOR MAKING BENZOYL HALIDES

Courtney Conover, St. Louis, Mo., assignor, by mesne assignments, to Monsanto Chemical Company, a corporation of Delaware No Drawing. Application June 10, 1929
Serial No. 369,933

7 Claims. (Cl. 260—123)

This invention relates to the manufacture of benzoyl chloride and benzoyl bromide, according to which ortho phthalic anhydride is caused to combine with a substantially dry hydrogen halide at elevated temperatures and preferably in the presence of an halogen carrying agent, which is capable of stimulating the reaction between the phthalic anhydride and the hydrogen halide.

One object of the invention is to provide a novel method of synthesizing the particular benzoyl derivatives, which utilizes inexpensive raw materials and avoids the problem of disposing of by-products.

Another object of the invention is to provide a method of manufacturing benzoyl halides, which is suspectible to continuous operation requiring but little attention and avoiding the necessity of expensive synthesizing ingredients.

Heretofore benzoyl chloride has been made by causing benzoic acid to react with phosphorous pentachloride. According to other processes, which have been suggested, the product is prepared from benzaldehyde, from benzotrichloride and from benzene. Uniformly, however, these processes have not been satisfactory, either because the yield is low, manufacturing conditions difficult to maintain, or too expensive. As a result, use of the benzoyl chloride in commerce has been restricted and the production of this material comparatively small. By my invention, the disadvantages of the former process are obviated, and one is able to obtain good yields of high grade product even with starting materials of inferior quality.

According to one embodiment of my invention, I mix approximately 100 pounds of phthalic anhydride with about four pounds of chromium chloride and heat the same to a temperature just below the boiling point of the anhydride. Advantageously the air in the container is displaced by introducing dry hydrogen chloride before the charge is heated. Subsequently and while the charge is agitated vigorously, hydrogen chloride is introduced immediately above or just below the surface of the molten mass at a rate of about three pounds of gas per hour. A temperature between 290° and 300° and a pressure of from 5 to 20 pounds per square inch are maintained.

The vapors which are released from the container comprises benzoyl chloride, phthalic anhydride, carbon dioxide and hydrogen chloride. An initial cooling of this mixture results in the separation of most of the phthalic anhydride; further cooling causes the remaining portion of the phthalic anhydride and the benzoyl chloride to condense. The fixed gases may thereafter be separated by scrubbing with water, as is well understood by those skilled in the art.

Although the preferred temperature range for batch operation is represented as being in the neighborhood of 300° C., the reaction may be conducted at widely different temperatures depending to a certain extent upon the catalyst and ranging from 200° C. upwardly. Obviously, when the phthalic anhydride is caused to react in a liquid state, a pressure greater than the partial pressure of the phthalic anhydride at the particular temperature is maintained.

It is to be noted, however, that the invention is not restricted to liquid phase operation. Similarly, the invention is not restricted to a batch type of operation. I have found for example that one may advantageously cause phthalic anhydride and hydrogen chloride to flow in parallel or counter-current fashion through a reacting tower containing the desired halogen carrying agent, such for example as chromium chloride. It is to be noted too that activating agents other than anhydrous chromium chloride may be employed—for example, chromium or zinc chlorides, oxychlorides, oxides and analogous compounds may be substituted. The activating materials probably undergo some change in the course of the reaction and for this reason my invention is not limited to the addition of a particular material as an initial activating ingredient. Although combined chromium is my preferred activating ingredient and has been found to stimulate the reaction to a highly favorable equilibrium ratio, the invention is not limited to the use of this ingredient, since other conditions will afford satisfactory yields, which are based upon the broad conception of reacting hydrogen chloride with ortho phthalic anhydride.

The reaction is best performed in the absence of water—that is, in a state which is substantially anhydrous. My experiments indicate, however, that a small amount of water is not objectionable and in fact probably takes part in the reaction. However, the amount necessary is so small that the ingredients employed will be found to contain sufficient moisture to supply the requirement. Large excesses of water at the temperatures of the reaction tend to promote the formation of benzoic acid, which, of course, will reduce the yield and make the isolation of the desired product more difficult.

Although I have specified a definite set of conditions under which the reaction takes place in its preferred form, and have indicated briefly the tendency which may be expected upon changing these conditions, it is to be understood that many other changes may be practiced without departing from the spirit of my invention, and I desire, therefore, that it be limited only as indicated in the appended claims.

I claim:

1. The method of manufacturing benzoyl halides that comprises causing phthalic anhydride when in a fluid state to react with a substantially dry hydrogen halide and in the presence of a decarboxylating catalyst at a temperature above 200° C. while avoiding pyrolytic decomposition.

2. The method of manufacturing benzoyl chloride that comprises causing phthalic anhydride when in a fluid state to react with substantially dry hydrogen chloride in the presence of an inorganic activating agent at a temperature above 200° C. while avoiding pyrolytic decomposition.

3. The method of manufacturing benzoyl chloride that comprises causing phthalic anhydride to react under substantially anhydrous conditions with hydrogen chloride in the presence of a catalytic agent embodying a metal salt at temperatures above 200° C. while avoiding pyrolytic decomposition and at pressures sufficient to maintain the phthalic anhydride in a liquid phase.

4. The method of manufacturing benzoyl chloride that comprises causing phthalic anhydride when in a fluid state to react under substantially anhydrous conditions with hydrogen chloride in the presence of a catalyst containing a compound of chromium at a temperature above 200° C. while avoiding pyrolytic decomposition.

5. The method of manufacturing benzoyl chloride that comprises causing phthalic anhydride to react under substantially anhydrous conditions with hydrogen chloride at a temperature of approximately 200°–300° C. in the presence of chromium chloride.

6. The method of manufacturing benzoyl chloride that comprises causing phthalic anhydride and hydrogen chloride to move continuously in a counter current manner with respect to each other, under substantially anhydous conditions in the presence of an activating agent and at temperatures above 200° C. while avoiding pyrolytic decomposition.

7. The method of manufacturing benzoyl chloride which consists in reacting phthalic anhydride with substantially anhydrous hydrogen chloride in the presence of a polyvalent metal salt as an activating agent, at a temperature above 200° C. while avoiding pyrolytic decomposition.

COURTNEY CONOVER.